United States Patent
Guo et al.

(10) Patent No.: US 12,536,274 B2
(45) Date of Patent: Jan. 27, 2026

(54) SECURITY DETECTING METHOD AND APPARATUS, AND DEVICE

(71) Applicant: Beijing Volcano Engine Technology Co., Ltd., Beijing (CN)

(72) Inventors: Jianxin Guo, Beijing (CN); Chen Zhang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 103 days.

(21) Appl. No.: 18/391,588

(22) Filed: Dec. 20, 2023

(65) Prior Publication Data
US 2024/0220605 A1    Jul. 4, 2024

(30) Foreign Application Priority Data
Dec. 28, 2022    (CN) .......................... 202211700105.9

(51) Int. Cl.
*G06F 21/54* (2013.01)
*G06F 21/56* (2013.01)

(52) U.S. Cl.
CPC ............ *G06F 21/54* (2013.01); *G06F 21/566* (2013.01); *G06F 2221/034* (2013.01)

(58) Field of Classification Search
CPC .. G06F 21/54; G06F 21/566; G06F 2221/034; G06F 21/53; G06F 9/45558; G06F 2009/45587; G06F 2009/45591
See application file for complete search history.

(56) References Cited

U.S. PATENT DOCUMENTS 10,922,386 B1 * 2/2021 Li ........................... G06F 21/53
2016/0373327 A1 * 12/2016 Degioanni ............ G06F 11/302
(Continued)

FOREIGN PATENT DOCUMENTS

| CN | 110138776 A | 8/2019 |
| CN | 110162381 A | 8/2019 |

(Continued)

OTHER PUBLICATIONS

China Patent Application No. 202211700105.9; Registration Notice; dated Jun. 5, 2024; 8 pages.
(Continued)

*Primary Examiner* — Trong H Nguyen
(74) *Attorney, Agent, or Firm* — BakerHostetler

(57) ABSTRACT

The present application discloses a security detecting method, apparatus, and device for a container. A security agent process is started by a detection process in the namespace of the detection process, and the security agent process is switched into a namespace of a target container process to be detected. The security agent process is controlled through the detection process to establish a communication connection with the target container process, so that a communication between the detection process and the target container process is realized by the security agent process. Specifically, a security detecting instruction is transmitted through the detection process to the security agent process, and forwarded by the security agent process to the target container process. Data to be detected is generated by the target container process in response to the security detecting instruction, and transmitted by the security agent process to the detection process for security detection.

20 Claims, 5 Drawing Sheets

(56) References Cited

U.S. PATENT DOCUMENTS

| | | |
|---|---|---|
| 2018/0247064 A1 | 8/2018 | Aronovich et al. |
| 2021/0328858 A1 | 10/2021 | Asveren et al. |
| 2022/0188444 A1 | 6/2022 | Stoller et al. |

FOREIGN PATENT DOCUMENTS

| | | | |
|---|---|---|---|
| CN | 110471852 A | | 11/2019 |
| CN | 112231045 A | | 1/2021 |
| CN | 114491557 A | * | 5/2022 |
| CN | 114978610 A | | 8/2022 |
| CN | 115373834 A | | 11/2022 |
| CN | 115454856 A | | 12/2022 |
| CN | 116226846 B | | 7/2024 |

OTHER PUBLICATIONS

Wang et al.; "Trusted Container Based on Docker"; J. Wuhan Univ (Nat. Sci. Ed.); vol. 63 No. 2; Apr. 2017; p. 102-108 (contains English Abstract).
China Patent Application No. 202211700105.9; Office Action; dated Mar. 22, 2024; 21 pages (contains English Translation).

\* cited by examiner

SECURITY DETECTING METHOD AND APPARATUS, AND DEVICE

CROSS REFERENCE TO RELATED APPLICATIONS

This application claims the priority of Chinese Patent Application No. 202211700105.9, filed on Dec. 28, 2022. For all the purpose under the U.S. law, the entire disclosure of the aforementioned application is incorporated herein by reference as part of the disclosure of this application.

TECHNICAL FIELD

The present application relates to the technical field of computers, and specifically, to a security detecting method, a security detecting apparatus, and an electronic device.

BACKGROUND

A container in the technical field of computers, which generally runs over an operating system, provides a relatively independent environment in which application programs are running, by using a mechanism supported by the operating system itself. When it is required to perform the security detection on the workload of the container, since the container process to be detected and the detection process are in different namespaces, it is required to switch the detection process into the namespace of the container process to be detected.

However, the container process to be detected might be controlled by a malicious process, then the running environment for the container process might be unsafe. After the detection process is switched to the namespace of the container process to be detected, the security of the detection process cannot be guaranteed. A more serious risk will be resulted since the detection process generally has the higher authority.

SUMMARY

In view of this, the embodiments of the present application provide a method, device and equipment for security detection of container, in order to improve the security when the detection process is performing container security detection.

In order to solve the above problem, the technical schemes provided by the embodiments of the present application is as follows.

In the first aspect, an embodiment of the present application provides a security detecting method for a container, which includes:
  starting a security agent process in a namespace of a detection process;
  transmitting, to the security agent process through the detection process, a namespace switching instruction, in which the namespace switching instruction includes an identifier of a target container process and is used to instruct the security agent process to switch from the namespace of the detection process to the namespace of the target container process;
  transmitting, to the security agent process through the detection process, an injecting instruction, in which the injecting instruction includes an identifier of the target container process and is used to instruct the security agent process to establish a communication connection with the target container process;
  transmitting, to the security agent process through the detection process, a security detecting instruction, and instructing the security agent process to forward the security detecting instruction to the target container process; and
  acquiring, from the security agent process through the detection process, data to be detected generated by the target container process in response to the security detecting instruction, and performing security detection on the data to be detected.

In the second aspect, an embodiment of the present application provides a security detecting method for a container, which includes:
  receiving, after a security agent process is started in a namespace of a detection process, through the security agent process, a namespace switching instruction transmitted by the detection process, in which the namespace switching instruction includes an identifier of a target container process;
  switching, through the security agent process, from the namespace of the detection process to the namespace of the target container process in response to the namespace switching instruction;
  receiving, through the security agent process, an injecting instruction transmitted by the detection process, in which the injecting instruction includes an identifier of the target container process;
  establishing, through the security agent process, a communication connection with the target container process in response to the injecting instruction;
  receiving, through the security agent process, a security detecting instruction transmitted by the detection process, and forwarding the security detecting instruction to the target container process; and
  acquiring, through the security agent process, data to be detected generated by the target container process in response to the security detecting instruction, and transmitting the data to be detected to the detection process.

In the third aspect, an embodiment of the present application provides a security detecting apparatus for a container, which includes a start unit, the first transmission unit, the second transmission unit, the third transmission unit, and a detection unit.

The start unit is configured to start a security agent process in a namespace of a detection process;
  the first transmission unit is configured to transmit, to the security agent process, a namespace switching instruction, in which the namespace switching instruction includes an identifier of a target container process and is used to instruct the security agent process to switch from the namespace of the detection process to the namespace of the target container process;
  the second transmission unit is configured to transmit, to the security agent process, an injecting instruction, in which the injecting instruction includes an identifier of the target container process and is used to instruct the security agent process to establish a communication connection with the target container process;
  the third transmission unit is configured to transmit, to the security agent process, a security detecting instruction, and instructing the security agent process to forward the security detecting instruction to the target container process;
  the detection unit is configured to acquire, from the security agent process, data to be detected generated by the target container process in response to the security detecting instruction, and performing security detection on the data to be detected.

In the fourth aspect, an embodiment of the present application provides a security detecting apparatus for container, which includes the first reception unit, a switching unit, the second reception unit, an establishment unit, the third reception unit, and an acquisition unit.

The first reception unit is configured to receive, after a namespace of a detection process starts a security agent process, a namespace switching instruction transmitted by the detection process, in which the namespace switching instruction includes an identifier of a target container process;

the switching unit is configured to switch from the namespace of the detection process to the namespace of the target container process in response to the namespace switching instruction;

the second reception unit is configured to receive an injecting instruction transmitted by the detection process, in which the injecting instruction includes an identifier of the target container process;

the establishment unit is configured to establish a communication connection with the target container process in response to the injecting instruction;

the third reception unit is configured to receive a security detecting instruction transmitted by the detection process, and forwarding the security detecting instruction to the target container process; and the acquisition unit is configured to acquire data to be detected generated by the target container process in response to the security detecting instruction, and transmitting the data to be detected to the detection process.

In the fifth aspect, an embodiment of the present application provides an electronic device, which includes:
one or more processors;
a storage apparatus having stored one or more programs thereon,
the one or more programs, when executed by the one or more processors, cause the one or more processors to implement the security detecting method for a container as described in any of the above first aspects or the security detecting method for a container as described in any of the above second aspects.

In the sixth aspect, an embodiment of the present application provides a computer-readable medium having stored a computer program thereon, in which the computer program, when executed by a processor, implements the security detecting method for container as described in any of the above first aspects or the security detecting method for container as described in any of the above second aspects.

Therefore, the embodiments of the present application have the following beneficial effects.

In the embodiments of the invention, a security agent process is started by a detection process in the namespace of the detection process, and the security agent process is switched into a namespace of a target container process to be detected. The security agent process is controlled through the detection process to establish a communication connection with the target container process, so that a communication between the detection process and the target container process is realized by the security agent process. Specifically, a security detecting instruction is transmitted through the detection process to the security agent process, and forwarded by the security agent process to the target container process. Data to be detected is generated by the target container process in response to the security detecting instruction, and transmitted by the security agent process to the detection process for security detection. Then the detection process keeps in communication only with the security agent process, and will not be directly switched to the namespace of the target container process, thus ensuring the security of the detection process.

DETAILED DESCRIPTION

In order to make the above objectives, features and advantages of the present application more obvious and easy to understand, the embodiments of the present application will be further described in detail in conjunction with the accompanying drawings and detailed description.

In order to facilitate the understanding and explanation of the technical scheme provided by the embodiments of the present application, the background technology of the embodiments of the present application will be illustrated first.

When security detection needs to be performed on the workload of container, since the container process being detected and the detection process are in different namespaces, it is required to switch the detection process into the namespace of the container process being detected. A namespace is used to isolate resources that different processes can access, and is the core technology of container.

However, the container process being detected might be controlled by a malicious process, then the running environment for the container process might be unsafe. After the detection process is switched to the namespace of the container process being detected, the network space of the detection process still belongs to the original namespace of the detection process, so that a malicious process can access the relevant network resources of the detection process, leading to risk penetration. Since the detection process generally has higher authority, a more serious risk will be resulted.

Based on this, the embodiments of the present application provide a method, apparatus, and device for security detection of a container, in which a security agent process is started by a detection process in the namespace of the detection process, and the security agent process is switched into a namespace of a target container process to be detected.

The security agent process is controlled through the detection process to establish a communication connection with the target container process, so that a communication between the detection process and the target container process is realized by the security agent process. Specifically, a security detecting instruction is transmitted through the detection process to the security agent process, and forwarded by the security agent process to the target container process. Data to be detected is generated by the target container process in response to the security detecting instruction, and transmitted by the security agent process to the detection process for security detection. Then the detection process keeps in communication only with the security agent process, and will not be directly switched to the namespace of the target container process, thus ensuring the security of the detection process.

Figure 1:
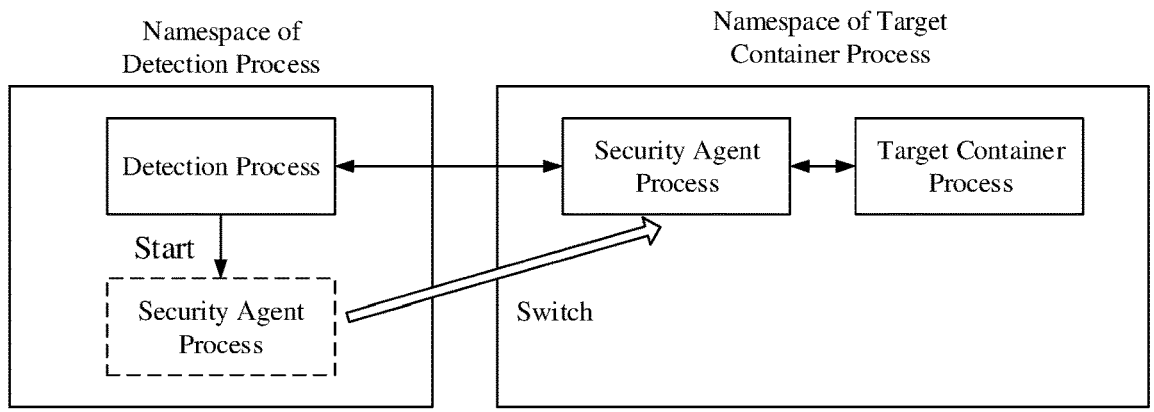
FIG. 1 is a schematic diagram of an exemplary application scenario provided by an embodiment of the present application.

In order to facilitate the understanding of the method provided by the embodiments of the present application, the following description will be made in conjunction with the scenario example illustrated in FIG. 1. Referring to FIG. 1, which is a schematic diagram of an exemplary application scenario provided by an embodiment of the present application.

A detection process runs in a namespace of the detection process, it is required to perform security detection on a target container process, which runs in a namespace of the target container process. The detection process first starts a security agent process in the namespace of the detection process, and then controls the security agent process to switch from the namespace of the detection process to the namespace of the target container process. Afterwards, by issuing instructions to the security agent process, the security agent process is made to establish a communication connection with the target container process. After the security agent process establishes a communication connection with the target container process, then the detection process may transmit a security detecting instruction to the target container process through the security agent process, and acquire, through the security agent process, data to be detected generated by the target container process in response to the security detecting instruction, so as to perform security detection on the data to be detected. In this way, the detection process itself does not need to switch to the namespace of the target container process, which fully guarantees the security of the detection process.

It can be understood by those skilled in the art that the schematic diagram of the framework illustrated in FIG. 1 is only an example in which the implementations of the present application can be implemented. The application scope of the implementations of the present application is not limited by any aspect of this framework.

In order to facilitate the understanding of the present application, a security detecting method for container provided by the embodiments of the present application will be described below with reference to the accompanying drawings.

Figure 2:
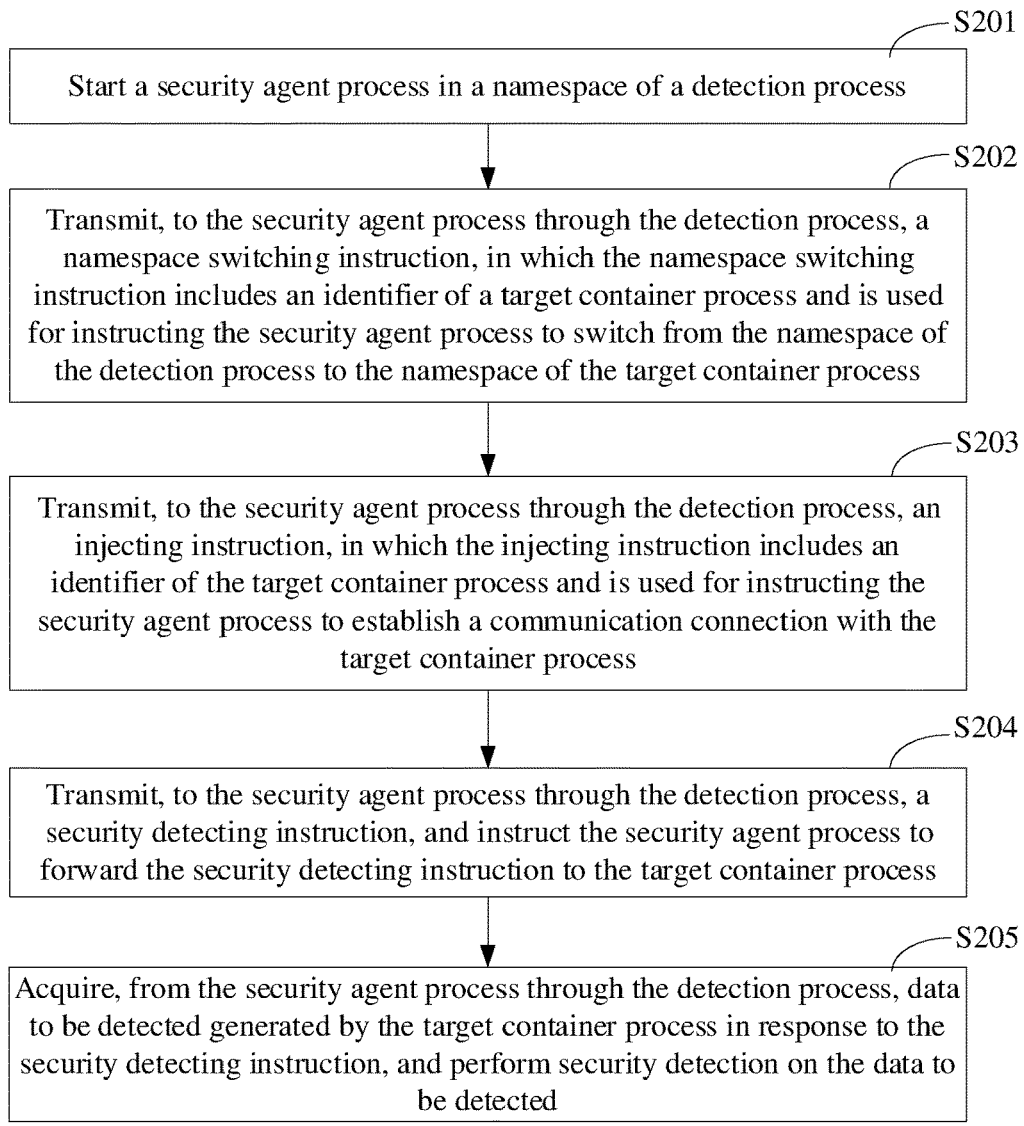
FIG. 2 is a flowchart of a security detecting method for container provided by an embodiment of the present application.

Referring to FIG. 2, which is a flowchart of a security detecting method for container provided by an embodiment of the present application. This embodiment will illustrate from the perspective of a detection process as an executive subject. As illustrated in FIG. 2, the security detecting method for container may include S201-S205:

S201: starting a security agent process in a namespace of a detection process.

When security detection for container is needed, a detection process starts a security agent process in a namespace of the detection process, which is a child process of the detection process. At this time, the security agent process is in the namespace of the detection process.

In practical application, the detection process establishes a command pipeline and a data pipeline. Under a Linux operating system, a child process will inherit a file descriptor already opened by a parent process, then the detection process may communicate with the security agent process through the command pipeline and the data pipeline. That is, the command pipeline and the data pipeline can be understood as files, and the detection process and the security agent process can read from and write to the command pipeline and the data pipeline through their file descriptors, so as to realize a communication between the detection process and the security agent process.

In one possible implementation, before transmitting a namespace switching instruction to the security agent process through the detection process in S202, the method may further include:
creating a control group through the detection process, setting a processor limit and/or memory limit of the control group, and switching the security agent process into the control group.

That is, by creating a control group (Cgroups) through the detection process, the control groups can realize a usage limit on resources. By setting the processor limit and/or memory limit of the control group and switching the security agent process into the control group, the usage of the processor and/or memory of the security agent process can be limited so as to avoid the security agent process from using excessive resources.

S202: transmitting, to the security agent process through the detection process, a namespace switching instruction, in which the namespace switching instruction includes an identifier of a target container process and is used to instruct the security agent process to switch from the namespace of the detection process to the namespace of the target container process.

The detection process transmits a namespace switching instruction to the security agent process through the command pipeline. The namespace switching instruction includes an identifier of the target container process to be detected. The namespace switching instruction is used to instruct the security agent process to switch from the namespace of the detection process to the namespace of the target container process.

The security agent process, in response to the namespace switching command, finds the namespace of the target container process by the identifier of the target container process, and switches from the namespace of the detection process to the namespace of the target container process. Specifically, contends, such as files, processes, networks, and IPCs (Inter-Process Communications), of the security agent process may be switched to the namespace of the target container process.

S203: transmitting, to the security agent process through the detection process, an injecting instruction, in which the injecting instruction includes an identifier of the target container process and is used to instruct the security agent process to establish a communication connection with the target container process.

The detection process transmits an injecting instruction to the security agent process through the command pipeline. The injecting instruction includes an identifier of the target container process, and the injecting instruction may further include an injection type. The injecting instruction is used to instruct the security agent process to establish a communication connection with the target container process.

The security agent process, in response to the injecting instruction, establishes a communication linked to the target container process. Take Java as an example, a SIGQUIT signal is transmitted to the target container process. After receiving this signal, the target container process will create, with the current target container process as a path, a Unix Domain Socket (UDS) for the path. The security agent process will link to the UDS, so that the security agent process establishes a communication connection with the target container process.

S204: transmitting, to the security agent process through the detection process, a security detecting instruction, and instructing the security agent process to forward the security detecting instruction to the target container process.

The detection process transmits a security detecting instruction to the security agent process through the command pipeline, and instructs the security agent process to forward the security detecting instruction to the target container process. The security agent process may transmit the security detecting instruction to the target container process through the established communication connection. For example, the security agent process may transmit the security detecting instruction to the target container process through the UDS. The security detecting instruction is used to instruct the target container process to generate data to be detected, such as to instruct the target container process to collect target code fragments in the target container process.

S205: acquiring, from the security agent process through the detection process, data to be detected generated by the target container process in response to the security detecting instruction, and performing security detection on the data to be detected.

After the target container process generates the data to be detected in response to the security detecting instruction, the security agent process may acquire the data to be detected. The security agent process transmits the data to be detected to the detection process through the data pipeline, and then the detection process performs security detection on the data to be detected. For example, the detection process detects whether a target code fragment in the target container process includes malicious code.

Based on the above description of S201-S205, in the embodiments of the invention, a security agent process is started by a detection process in the namespace of the detection process, and the security agent process is switched into a namespace of a target container process to be detected. The security agent process is controlled through the detection process to establish a communication connection with the target container process, so that a communication between the detection process and the target container process is realized by the security agent process. Specifically, a security detecting instruction is transmitted through the detection process to the security agent process, and forwarded by the security agent process to the target container process. Data to be detected is generated by the target container process in response to the security detecting instruction, and transmitted by the security agent process to the detection process for security detection. Then the detection process keeps in communication only with the security agent process, and will not be directly switched to the namespace of the target container process, thus ensuring the security of the detection process.

In one possible implementation, a detection file may be used to trigger the target container process to generate the data to be detected. Then after transmitting the namespace switching command to the security agent process through the detection process in S202, the method may further include:

transmitting, through the detection process, a file coping instruction to the security agent process, in which the file coping instruction includes information of a detection file and is used for instructing the security agent process to acquire the detection file according to the information of the detection file, and writing the detection file into a specified path in the namespace of the target container process.

The detection process transmits a file coping instruction to the security agent process through the command pipeline. The file coping instruction includes information of a detection file, such as the size of the detection file, the saving path, and the specified path to which the namespace of the target container process is written. The file coping instruction instructs the security agent process to acquire the detection file according to the information of the detection file and write the detection file to the specified path in the namespace of the target container process.

The security agent process acquires the detection file from the detection process through the data pipeline according to the information of the detection file, and then writes the detection file to the specified path. The detection file may instruct the target container process how to generate the data to be detected. In addition, copying the detection file to the namespace of the target container process through the data pipeline can make it possible to be compatible with different container file systems.

In one possible implementation, after the detection file is written to the namespace of the target container process, the specific implementation of S204 transmitting, to the security agent process through the detection process, a security detecting instruction, and instructing the security agent process to forward the security detecting instruction to the target container process may include:

transmitting, to the security agent process through the detection process, a loading instruction of the detection file, and instructing the security agent process to forward the loading instruction of the detection file to the target container process, in which the loading instruction of the detection file is used for instructing the target container process to acquire the detection file from the specified path and load and execute the detection file to generate data to be detected.

In the embodiment of the present application, the detection process transmits the loading instruction of the detection file to the security agent process through the command pipeline, that is, the security detecting instruction is specifically the loading instruction of the detection file. The security agent process forwards the loading instruction of the detection file to the target container process, and the target container process acquires the detection file from the specified path to which the detection file is written, and loads and executes the detection file. When the target container process executes the detection file, it can generate the data to be detected, for example to collect target code fragments in the target container process according to the execution of the detection file. As such, the generation of the data to be detected is triggered by the detection file.

In practical application, a large number of data to be detected being directly transmitted by the target container process to the security agent process, will affect the normal operation of the target container process. Therefore, in one possible implementation, after transmitting a namespace switching instruction to the security agent process through the detection process in S202, the method may further include:
- transmitting, to the security agent process through the detection process, a shared memory creating instruction, instructing the security agent process to create a shared memory in the namespace of the target container process, and transmitting an identifier of the shared memory to the detection process;
- acquiring the identifier of the shared memory through the detection process.

In the embodiment of the present application, in order to avoid the influence by the transmission of the data to be detected on the target container process, a shared memory may be created in the namespace of the target container process. The detection process transmits a shared memory creating instruction to the security agent process through the command pipeline. The security agent process creates, in response to the shared memory creating instruction, a shared memory in the namespace of the target container process, and transmits an identifier of the shared memory to the detection process.

In one possible implementation, the method may further include:
- transmitting, to the security agent process through the detection process, a shared memory identifier distributing instruction, and instructing the security agent process to transmit the identifier of the shared memory to the target container process, in which the identifier of the shared memory is used for instructing the target container process to write the data to be detected into the shared memory after generating the data to be detected.

After receiving the identifier of the shared memory, the detection process transmits a shared memory identifier distributing instruction to the security agent process through the command pipeline. The security agent process transmits the identifier of the shared memory to the target container process, so as to write the data to be detected into the shared memory after the target container process generates the data to be detected, instead of directly transmitting the data to be detected to the security agent process.

Based on this, in one possible implementation, the specific implementation of S205 acquiring, from the security agent process through the detection process, data to be detected generated by the target container process in response to the security detecting instruction, and performing security detection on the data to be detected may include:
- acquiring, through the detection process, the data to be detected from the security agent process, and performing security detection on the data to be detected, in which the data to be detected is acquired by the security agent process from the shared memory.

That is, after writing the data to be detected to the shared memory, the target container process may inform the security agent process to read the data, then the security agent process may acquire the data to be detected from the shared memory, and then transmit the data to be detected to the detection process through the data pipeline. The detection process performs security detection on the data to be detected. For example, the detection process detects whether a target code fragment in the target container process includes malicious code.

In this way, the transmission of the data to be detected between the target container process and the security agent process is realized through the shared memory, without affecting the normal operation of the target container process.

In addition, after completing the security detection of the data to be detected, the detection process may further transmit a completing instruction to the security agent process through the command pipeline. The security agent process, in response to the completing instruction, deletes the shared memory as well as the detection file, and completes the process, so that the security agent process exits the namespace of the target container process.

Figure 3:
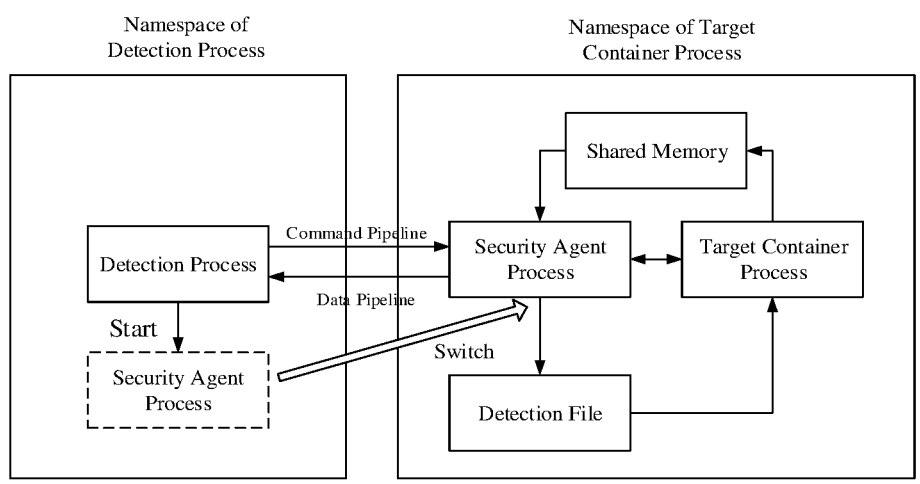
FIG. 3 is a schematic diagram of another exemplary application scenario provided by an embodiment of the present application.

Referring to FIG. 3, which illustrates a schematic diagram of another exemplary application scenario provided by an embodiment of the present application. In conjunction with the schematic diagram, a security detecting method for container provided by the embodiment of the present application in the practical application is illustrated.

When security detection for the container is needed, a detection process starts a security agent process in a namespace of the detection process. At this time, the security agent process is in the namespace of the detection process.

The detection process establishes a command pipeline and a data pipeline, through which the detection process can communicate with the security agent process.

The detection process creates a control group, sets a processor limit and/or memory limit of the control group, and switches the security agent process into the control group.

The detection process transmits a namespace switching instruction to the security agent process through the command pipeline, in which the namespace switching instruction includes an identifier of a target container process to be detected.

The security agent process, in response to the namespace switching command, finds the namespace of the target container process by the identifier of the target container process, and switches from the namespace of the detection process to the namespace of the target container process.

The detection process transmits a file coping instruction to the security agent process through the command pipeline, in which the file coping instruction includes information of detection file. The security agent process acquires the detection file from the detection process through the data pipeline according to the information of the detection file, and then writes the detection file to a specified path in the namespace of the target container process.

The detection process transmits a shared memory creating instruction to the security agent process through the command pipeline. The security agent process, in response to the shared memory creating instruction, creates a shared memory in the namespace of the target container process, and transmits an identifier of the shared memory to the detection process.

The detection process transmits an injecting instruction to the security agent process through the command pipeline, in which the injecting instruction includes an identifier of the target container process. The security agent process, in response to the injecting instruction, establishes a communication connection with the target container process.

After receiving the shared memory identifier, the detection process transmits a shared memory identifier distributing instruction to the security agent process through the command pipeline. The security agent process transmits the identifier of the shared memory to the target container process.

The detection process transmits a loading instruction of the detection file to the security agent process through the command pipeline, and the security agent process forwards the loading instruction of the detection file to the target container process. The target container process acquires the detection file from the specified path to which the detection file is written, and loads and executes the detection file.

After generating data to be detected, the target container process writes the data to be detected to the shared memory according to the identifier of the shared memory. The security agent process acquires the data to be detected from the shared memory, and then transmits the data to be detected to the detection process through the data pipeline. The detection process performs security detection on the data to be detected.

After completing the security detection of the data to be detected, the detection process transmits a completing instruction to the security agent process through the command pipeline. The security agent process, in response to the completing instruction, deletes the shared memory as well as the detection file, and completes the process.

Through the above procedure, the security agent process, instead of the detection process, runs in the namespace of the target container process. Since the detection process has not been switched to the namespace of the target container process, even if the namespace of the target container process is unsafe, the detection process will not be directly affect, thus guaranteeing the security of the detection process. In addition, the interaction between the detection process and the target container process is realized through the security agent process, which has good scalability and can adapt to different needs.

Figure 4:
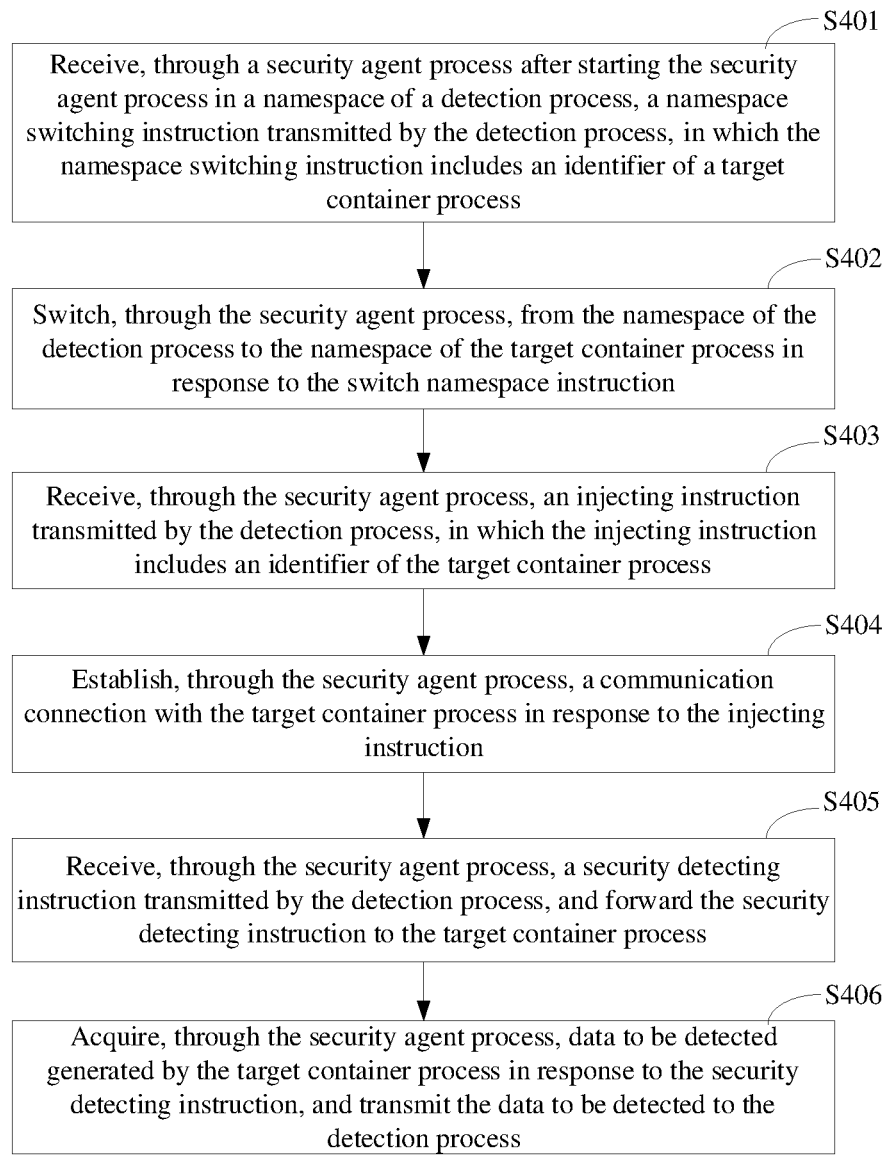
FIG. 4 is a flowchart of another security detecting method for container provided by an embodiment of the present application.

Referring to FIG. 4, which is a flowchart of another security detecting method for container provided by an embodiment of the present application. This embodiment is illustrated from the perspective of the security agent process as the execution subject. As illustrated in FIG. 4, the security detecting method for container may include S401-S406:

S401: receiving, through a security agent process after starting the security agent process in a namespace of a detection process, a namespace switching instruction transmitted by the detection process, in which the namespace switching instruction includes an identifier of a target container process.

S402: switching, through the security agent process, from the namespace of the detection process to the namespace of the target container process in response to the namespace switching instruction.

S403: receiving, through the security agent process, an injecting instruction transmitted by the detection process, in which the injecting instruction includes an identifier of the target container process.

S404: establishing, through the security agent process, a communication connection with the target container process in response to the injecting instruction.

S405: receiving, through the security agent process, a security detecting instruction transmitted by the detection process, and forwarding the security detecting instruction to the target container process.

S406: acquiring, through the security agent process, data to be detected generated by the target container process in response to the security detecting instruction, and transmitting the data to be detected to the detection process.

In one possible implementation, after switching, through the security agent process, from the namespace of the detection process to the namespace of the target container process in response to the namespace switching instruction in S402, the method may further include:

receiving, through the security agent process, a file coping instruction transmitted by the detection process, in which the file coping instruction includes information of a detection file;

acquiring, according to the information of the detection file through the security agent process, the detection file, and writing the detection file into a specified path in the namespace of the target container process.

In one possible implementation, the specific implementation of S405 receiving, through the security agent process, a security detecting instruction transmitted by the detection process, and forwarding the security detecting instruction to the target container process may include:

receiving, through the security agent process, a loading instruction of the detection file transmitted by the detection process, and forwarding the loading instruction of the detection file to the target container process, in which the loading instruction of the detection file is used for instructing the target container process to acquire the detection file from the specified path and load and execute the detection file to generate data to be detected.

In one possible implementation, after switching, through the security agent process, from the namespace of the detection process to the namespace of the target container process in response to the namespace switching instruction in S402, the method may further include:

receiving, through the security agent process, a shared memory creating instruction transmitted by the detection process, creating a shared memory in the namespace of the target container process, and transmitting an identifier of the shared memory to the detection process.

In one possible implementation, the method may further include:

receiving, through the security agent process, a shared memory identifier distributing instruction transmitted by the detection process, transmitting the identifier of the shared memory to the target container process, and instructing the target container process to write the data to be detected into the shared memory after generating the data to be detected.

In one possible implementation, the specific implementation of S406 acquiring, through the security agent process, data to be detected generated by the target container process in response to the security detecting instruction, and transmitting the data to be detected to the detection process may include:

acquiring, through the security agent process, the data to be detected generated by the target container process from the shared memory, and transmitting the data to be detected to the detection process.

In this embodiment, the security detecting method for container is implemented with the security agent process as the execution subject, and the detailed illustration of the implementation procedure can refer to the above various embodiments, which will not be detailed here.

In the embodiments of the invention, a security agent process is started by a detection process in the namespace of the detection process, and the security agent process is switched into a namespace of a target container process to be detected. The security agent process is controlled through the detection process to establish a communication connection with the target container process, so that a communication between the detection process and the target container process is realized by the security agent process. Specifically, a security detecting instruction is transmitted through the detection process to the security agent process, and forwarded by the security agent process to the target container process. Data to be detected is generated by the target container process in response to the security detecting instruction, and transmitted by the security agent process to the detection process for security detection. Then the detection process keeps in communication only with the security agent process, and will not be directly switched to the namespace of the target container process, thus ensuring the security of the detection process.

Based on the security detecting method for container provided by the above method embodiment, the embodiments of the present application further provide a security detecting apparatus for container, which will be described in conjunction with the accompanying drawings.

Figure 5:
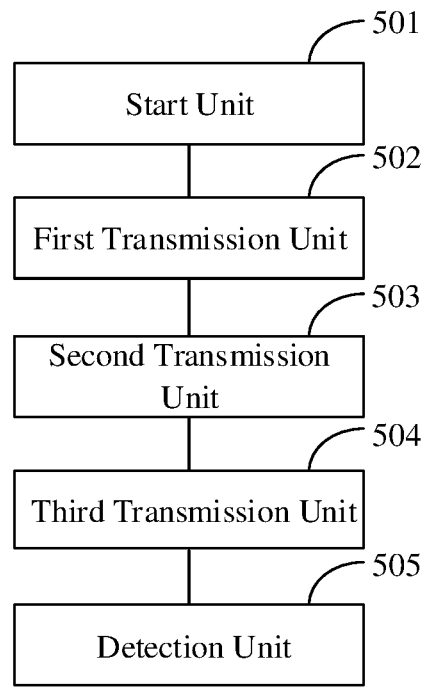
FIG. 5 is a schematic diagram of a security detecting apparatus for container provided by an embodiment of the present application.

Referring to FIG. 5, which is a structural schematic diagram of a security detecting apparatus for a container provided by an embodiment of the present application. As illustrated in FIG. 5, the security detecting apparatus for a container includes the start unit 501, the first transmission unit 502, the second transmission unit 503, the third transmission unit 504, and the detection unit 505.

The start unit 501 is configured to start a security agent process in a namespace of a detection process;

the first transmission unit 502 is configured to transmit, to the security agent process, a namespace switching instruction, in which the namespace switching instruction includes an identifier of a target container process and is used to instruct the security agent process to switch from the namespace of the detection process to the namespace of the target container process;

the second transmission unit 503 is configured to transmit, to the security agent process, an injecting instruction, in which the injecting instruction includes an identifier of the target container process and is used to instruct the security agent process to establish a communication connection with the target container process;

the third transmission unit 504 is configured to transmit, to the security agent process, a security detecting instruction, and instruct the security agent process to forward the security detecting instruction to the target container process; and the detection unit 505 is configured to acquire, from the security agent process, data to be detected generated by the target container process in response to the security detecting instruction, and perform security detection on the data to be detected.

In one possible implementation, the security detecting apparatus further includes the fourth transmission unit.

The fourth transmission unit is configured to transmit a file coping instruction to the security agent process, in which the file coping instruction includes information of a detection file and is used to instruct the security agent process to acquire the detection file according to the information of the detection file, and write the detection file into a specified path in the namespace of the target container process.

In one possible implementation, the third transmission unit is specifically configured to:

transmit, to the security agent process through the detection process, a loading instruction of the detection file, and instruct the security agent process to forward the loading instruction of the detection file to the target container process, in which the loading instruction of the detection file is used to instruct the target container process to acquire the detection file from the specified path and load and execute the detection file to generate data to be detected.

In one possible implementation, the security detecting apparatus further includes: the fifth transmission unit and the acquisition unit.

The fifth transmission unit is configured to transmit, to the security agent process, a shared memory creating instruction, instruct the security agent process to create a shared memory in the namespace of the target container process, and transmit an identifier of the shared memory to the detection process.

The acquisition unit is configured to acquire the identifier of the shared memory.

In one possible implementation, the security detecting apparatus further includes the sixth transmission unit.

The sixth transmission unit is configured to transmit, to the security agent process, a shared memory identifier distributing instruction, and instruct the security agent process to transmit the identifier of the shared memory to the target container process, in which the identifier of the shared memory is used to instruct the target container process to write the data to be detected into the shared memory after generating the data to be detected.

In one possible implementation, the detection unit is specifically configured to:

acquire, by the detection process, the data to be detected from the security agent process, and perform security detection on the data to be detected, in which the data to be detected is acquired by the security agent process from the shared memory.

In one possible implementation, the security detecting apparatus further includes the creation unit.

The creation unit is configured to create a control group by the detection process, set a processor limit and/or memory limit of the control group, and switch the security agent process into the control group.

Based on another security detecting method for a container provided by the above method embodiment, the embodiments of the present application further provide another security detecting apparatus for a container, which will be described in conjunction with the accompanying drawings.

Figure 6:
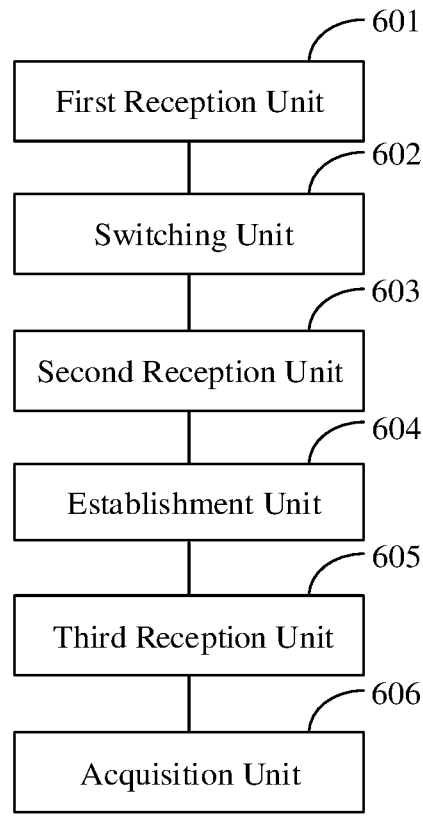
FIG. 6 is a schematic diagram of another security detecting apparatus for container provided by an embodiment of the present application.

Referring to FIG. 6, which is a structural schematic diagram of another security detecting apparatus for container provided by an embodiment of the present application. As illustrated in FIG. 6, the security detecting apparatus for a container includes the first reception unit 601, the switching unit 602, the second reception unit 603, the establishment unit 604, the third reception unit 605, and the acquisition unit 606.

The first reception unit 601 is configured to receive, after a namespace of a detection process starts a security agent process, a namespace switching instruction transmitted by the detection process, in which the namespace switching instruction includes an identifier of a target container process.

The switching unit 602 is configured to switch from the namespace of the detection process to the namespace of the target container process in response to the namespace switching instruction.

The second reception unit 603 is configured to receive an injecting instruction transmitted by the detection process, in which the injecting instruction includes an identifier of the target container process.

The establishment unit 604 is configured to establish a communication connection with the target container process in response to the injecting instruction.

The third reception unit 605 is configured to receive a security detecting instruction transmitted by the detection process, and forward the security detecting instruction to the target container process.

The acquisition unit 606 is configured to acquire data to be detected generated by the target container process in response to the security detecting instruction, and transmit the data to be detected to the detection process.

In one possible implementation, the security detecting apparatus further includes the fourth reception unit and the writing unit.

The fourth reception unit is configured to receive a file coping instruction transmitted by the detection process, in which the file coping instruction includes information of a detection file.

The writing unit is configured to acquire, according to the information of the detection file, the detection file, and write the detection file into a specified path in the namespace of the target container process.

In one possible implementation, the third reception unit is specifically configured to:
receive, by the security agent process, a loading instruction of the detection file transmitted by the detection process, and forward the loading instruction of the detection file to the target container process, in which the loading instruction of the detection file is used to instruct the target container process to acquire the detection file from the specified path and load and execute the detection file to generate data to be detected.

In one possible implementation, the security detecting apparatus further includes the fifth reception unit.

The fifth reception unit is configured to receive a shared memory creating instruction transmitted by the detection process, create a shared memory in the namespace of the target container process, and transmit an identifier of the shared memory to the detection process.

In one possible implementation, the security detecting apparatus further includes the sixth reception unit.

The sixth reception unit is configured to receive a shared memory identifier distributing instruction transmitted by the detection process, transmit the identifier of the shared memory to the target container process, and instruct the target container process to write the data to be detected into the shared memory after generating the data to be detected.

In one possible implementation, the acquisition unit is specifically configured to:
acquire, by the security agent process, the data to be detected generated by the target container process from the shared memory, and transmit the data to be detected to the detection process.

Based on the security detecting method for container provided by the above method embodiment, the present application further provides an electronic device, which includes: one or more processors; a storage apparatus having stored one or more programs thereon, in which the one or more programs when executed by the one or more processors, cause the one or more processors to implement the security detecting method for container as described in any of the above embodiments.

Figure 7:
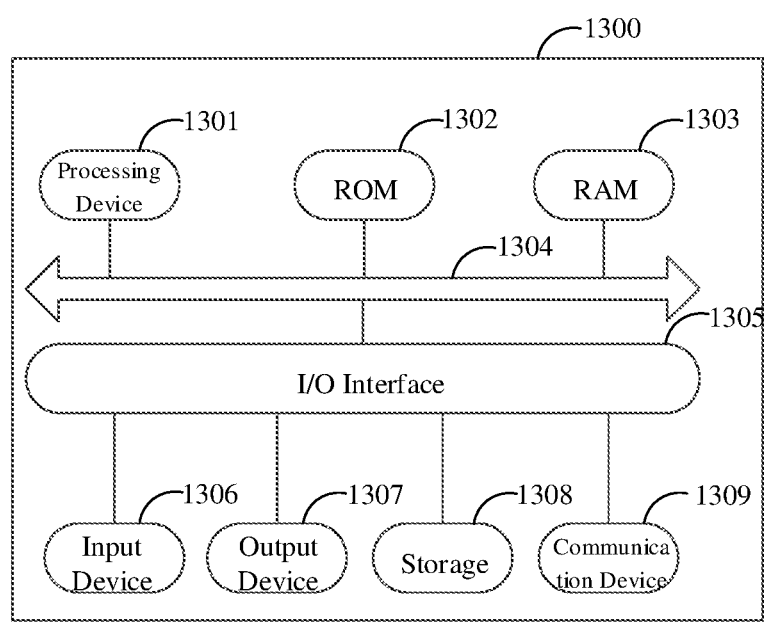
FIG. 7 is a schematic diagram of an electronic device provided by an embodiment of the present application.

Referring to FIG. 7, FIG. 7 illustrates a schematic diagram of a structure suitable for implementing an electronic device 1300 in the embodiments of the present application. The terminal equipment in the embodiments of the present application may include, but is not limited to, mobile terminal such as mobile phone, notebook computer, digital broadcast receiver, PDA (Personal Digital Assistant), PAD (Portable Android Device (tablet)), PMP (Portable Media Player), vehicle-mounted terminal (e.g., vehicle navigation terminal), etc., and stationary terminal such as digital TV (television), desktop computer, etc. The electronic device illustrated in FIG. 7 is merely an example, and should not bring any limitation to the functions and application scope of the embodiments of the present application.

As illustrated in FIG. 7, the electronic device 1300 may include a processing device (e.g., central processing unit, graphics processor, etc.) 1301, which may perform various appropriate actions and processes according to a program stored in a read-only memory (ROM) 1302 or a program loaded from a storage 1308 into a random access memory (RAM) 1303. In the RAM 1303, various programs and data required for the operations of the electronic device 1300 are also stored. The processing device 1301, the ROM 1302 and the RAM 1303 are connected to each other through a bus 1304. An input/output (I/O) interface 1305 is also connected to the bus 1304.

Generally, the following devices may be connected to the I/O interface 1305: an input device 1306 including, for example, touch screen, touch pad, keyboard, mouse, camera, microphone, accelerometer, gyroscope, etc.; an output device 1307 including, for example, liquid crystal display (LCD), speaker, vibrator, etc.; a storage 1308 including, for example, magnetic tape, hard disk, etc.; and a communication device 1309. The communication device 1309 may allow the electronic device 1300 to perform wireless or wired communication with other equipment to exchange data. Although FIG. 13 illustrates an electronic device 1300 with various devices, it should be understood that it is not required to implement or provide all the devices shown. Alternatively, more or less devices may be implemented or provided.

In particular, according to an embodiment of the present application, the procedure described above with reference to the flowchart can be implemented as a computer software program. For example, an embodiment of the present application includes a computer program product comprising a computer program carried on a non-transient computer-readable medium, in which the computer program contains program code for performing the method illustrated in the flowchart. In such an embodiment, the computer program can be downloaded and installed from the network through the communication device 1309, or installed from the storage 1308 or from the ROM 1302. The computer program, when executed by the processing device 1301, performs the above functions defined in the methods of the embodiments of the present application.

The electronic device provided by the embodiments of the present application belongs to the same inventive concept as a security detecting method for container provided by the above embodiments. The technical details not elaborately described in this embodiment can refer to the above embodiments. Moreover, this embodiment has the same beneficial effects as the above embodiments.

Based on a security detecting method for container provided by the above method embodiments, the embodiments of the present application provide a computer-readable medium having stored thereon a computer program, in which the program, when executed by a processor, implements the security detecting method for container as described in any of the above embodiments.

It should be noted that the above computer-readable medium in the present application may be a computer-readable signal medium or a computer-readable storage medium or any combination of both. The computer-readable storage medium may be, for example, but not limited to, an electrical, magnetic, optical, electromagnetic, infrared, or semiconductor system, device or equipment, or any combination thereof. More specific examples of computer-readable storage media may include, but are not limited to, electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage apparatus, magnetic storage apparatus, or any suitable combination thereof. In the present application, computer-readable storage medium may be any tangible medium containing or storing a program, which may be used by or in conjunction with an instruction execution system, device or equipment. In the present application, computer-readable signal medium may include data signals propagated in baseband or as part of a carrier wave, in which computer-readable program code is carried. Such propagated data signal may take many forms, including but not limited to electromagnetic signal, optical signal or any suitable combination thereof. Computer-readable signal medium may also be any computer-readable medium other than a computer-readable storage medium, and the computer-readable signal medium may transmit, propagate or transmit a program for use by or in conjunction with an instruction execution system, device or apparatus. The program code contained in the computer-readable medium may be transmitted by any appropriate medium, including but not limited to: wire, optical cable, RF (radio frequency) and the like, or any suitable combination thereof.

In some embodiments, a client or server may communicate by utilizing any currently known or future developed network protocol such as HTTP (HyperText Transfer Protocol), and may be interconnected with digital data communication in any form or medium (e.g., communication network). Examples of communication networks include local area network ("LAN"), wide area network ("WAN"), network of network (e.g., Internet) and end-to-end network (e.g., ad hoc end-to-end network), as well as any currently known or future developed network.

The above computer-readable medium may be included in the above electronic device, or may exist separately without being assembled into the electronic device.

The above computer-readable medium carries one or more programs which, when executed by the electronic device, cause the electronic device to perform the above security detecting method for container.

The computer program code for performing the operations of the embodiments of the present application may be written in one or more programming languages or a combination thereof, including but not limited to object-oriented programming language, such as Java, Smalltalk, C++, etc., and conventional procedural programming language, such as "C" language or the like. The program code can be completely executed on a user computer, partially executed on the user computer, executed as an independent software package, partially executed on the user computer and partially executed on a remote computer, or completely executed on a remote computer or server. In the case involving a remote computer, the remote computer may be connected to the user computer through any kind of network, including local area network (LAN) or wide area network (WAN), or may be connected to an external computer (e.g., through the Internet using an Internet service provider).

The flowcharts and block diagrams in the accompanying drawings illustrate architectures, functions and operations of possible implementations of systems, methods and computer program products according to various embodiments of the present application. In this regard, each block in the flowcharts or block diagrams may represent a module, a program segment, or a part of code that contains one or more executable instructions for implementing specified logical functions. It should also be noted that, in some alternative implementations, the functions noted in the blocks may occur in a different order than those noted in the drawings. For example, two blocks illustrated in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

The involved units described in the embodiments of the present application may be implemented either in software or in hardware. The name of unit/module does not limit the unit itself in some case. For example, a voice data collection module can also be described as a "data collection module".

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the embodiments of the present application, machine-readable medium may be tangible medium, which may contain or store a program for use by or in conjunction with an instruction execution system, device or equipment. The machine-readable medium may be machine-readable signal medium or machine-readable storage medium. The machine-readable medium may include, but is not limited to, an electronic, magnetic, optical, electromagnetic, infrared, or semiconductor system, device or equipment, or any suitable combination thereof. More specific examples of machine-readable storage medium may include electrical connection based on one or more wires, portable computer disk, hard disk, random access memory (RAM), read-only memory (ROM), erasable programmable read-only memory (EPROM or flash memory), optical fiber, portable compact disk read-only memory (CD-ROM), optical storage apparatus, magnetic storage apparatus, or any suitable combination thereof.

According to one or more embodiments of the present application, [Example 1] provides a security detecting method for a container, which includes:

starting a security agent process in a namespace of a detection process;

transmitting, to the security agent process through the detection process, a namespace switching instruction, in which the namespace switching instruction includes an identifier of a target container process and is used to instruct the security agent process to switch from the namespace of the detection process to the namespace of the target container process;

transmitting, to the security agent process through the detection process, an injecting instruction, in which the injecting instruction includes an identifier of the target container process and is used to instruct the security agent process to establish a communication connection with the target container process;

transmitting, to the security agent process through the detection process, a security detecting instruction, and instructing the security agent process to forward the security detecting instruction to the target container process;

acquiring, from the security agent process through the detection process, data to be detected generated by the target container process in response to the security detecting instruction, and performing security detection on the data to be detected.

According to one or more embodiments of the present application, [Example 2] provides a security detecting method for a container, in which after the transmitting, to the security agent process through the detection process, a namespace switching instruction, the method further includes:

transmitting, through the detection process, a file coping instruction to the security agent process, in which the file coping instruction includes information of a detection file and is used to instruct the security agent process to acquire the detection file according to the information of the detection file, and writing the detection file into a specified path in the namespace of the target container process.

According to one or more embodiments of the present application, [Example 3] provides a security detecting method for a container, in which the transmitting, to the security agent process through the detection process, a security detecting instruction, and instructing the security agent process to forward the security detecting instruction to the target container process includes:

transmitting, to the security agent process through the detection process, a loading instruction of the detection file, and instructing the security agent process to forward the loading instruction of the detection file to the target container process, in which the loading instruction of the detection file is used to instruct the target container process to acquire the detection file from the specified path and load and execute the detection file to generate data to be detected.

According to one or more embodiments of the present application, [Example 4] provides a security detecting method for a container, in which after the transmitting, to the security agent process through the detection process, a namespace switching instruction, the method further includes:

transmitting, to the security agent process through the detection process, a shared memory creating instruction, instructing the security agent process to create a shared memory in the namespace of the target container process, and transmitting an identifier of the shared memory to the detection process; and acquiring the identifier of the shared memory through the detection process.

According to one or more embodiments of the present application, [Example 5] provides a security detecting method for container, which further includes:

transmitting, to the security agent process through the detection process, a shared memory identifier distributing instruction, and instructing the security agent process to transmit the identifier of the shared memory to the target container process, in which the identifier of the shared memory is used to instruct the target container process to write the data to be detected into the shared memory after generating the data to be detected.

According to one or more embodiments of the present application, [Example 6] provides a security detecting method for a container, in which the acquiring, from the security agent process through the detection process, data to be detected generated by the target container process in response to the security detecting instruction, and performing security detection on the data to be detected includes:

acquiring, through the detection process, the data to be detected from the security agent process, and performing security detection on the data to be detected, in which the data to be detected is acquired by the security agent process from the shared memory.

According to one or more embodiments of the present application, [Example 7] provides a security detecting method for a container, in which before the transmitting, to the security agent process through the detection process, a namespace switching instruction, the method further includes:

creating a control group through the detection process, setting a processor limit and/or memory limit of the control group, and switching the security agent process into the control group.

According to one or more embodiments of the present application, [Example 8] provides a security detecting method for a container, which includes:

receiving, through a security agent process after starting the security agent process in a namespace of a detection process, a namespace switching instruction transmitted by the detection process, in which the namespace switching instruction includes an identifier of a target container process;

switching, through the security agent process, from the namespace of the detection process to the namespace of the target container process in response to the namespace switching instruction;

receiving, through the security agent process, an injecting instruction transmitted by the detection process, in which the injecting instruction includes an identifier of the target container process;

establishing, through the security agent process, a communication connection with the target container process in response to the injecting instruction;

receiving, through the security agent process, a security detecting instruction transmitted by the detection process, and forwarding the security detecting instruction to the target container process;

acquiring, through the security agent process, data to be detected generated by the target container process in response to the security detecting instruction, and transmitting the data to be detected to the detection process.

According to one or more embodiments of the present application, [Example 9] provides a security detecting method for a container, in which after the switching, through the security agent process, from the namespace of the detection process to the namespace of the target container process in response to the namespace switching instruction, the method further includes:

receiving, through the security agent process, a file coping instruction transmitted by the detection process, in which the file coping instruction includes information of a detection file;

acquiring, according to the information of the detection file through the security agent process, the detection file, and writing the detection file into a specified path in the namespace of the target container process.

According to one or more embodiments of the present application, [Example 10] provides a security detecting method for container, in which the receiving, through the security agent process, a security detecting instruction transmitted by the detection process, and forwarding the security detecting instruction to the target container process includes:

receiving, through the security agent process, a loading instruction of the detection file transmitted by the detection process, and forwarding the loading instruction of the detection file to the target container process, in which the loading instruction of the detection file is used to instruct the target container process to acquire the detection file from the specified path and load and execute the detection file to generate data to be detected.

According to one or more embodiments of the present application, [Example 11] provides a security detecting method for a container, in which after the switching, through the security agent process, from the namespace of the detection process to the namespace of the target container process in response to the namespace switching instruction, the method further includes:

receiving, through the security agent process, a shared memory creating instruction transmitted by the detection process, creating a shared memory in the namespace of the target container process, and transmitting an identifier of the shared memory to the detection process.

According to one or more embodiments of the present application, [Example 12] provides a security detecting method for container, which further includes:

receiving, through the security agent process, a shared memory identifier distributing instruction transmitted by the detection process, transmitting the identifier of the shared memory to the target container process, and instructing the target container process to write the data to be detected into the shared memory after generating the data to be detected.

According to one or more embodiments of the present application, [Example 13] provides a security detecting method for container, in which the acquiring, through the security agent process, data to be detected generated by the target container process in response to the security detecting instruction, and transmitting the data to be detected to the detection process includes:

acquiring, through the security agent process, the data to be detected generated by the target container process from the shared memory, and transmitting the data to be detected to the detection process.

According to one or more embodiments of the present application, [Example 14] provides a security detecting apparatus for a container, which includes the start unit, the first transmission unit, the second transmission unit, the third transmission unit, and the detection unit.

The start unit is configured to start a security agent process in a namespace of a detection process;

the first transmission unit is configured to transmit, to the security agent process, a namespace switching instruction, in which the namespace switching instruction includes an identifier of a target container process and is used to instruct the security agent process to switch from the namespace of the detection process to the namespace of the target container process;

the second transmission unit is configured to transmit, to the security agent process, an injecting instruction, in which the injecting instruction includes an identifier of the target container process and is used to instruct the security agent process to establish a communication connection with the target container process;

the third transmission unit is configured to transmit, to the security agent process, a security detecting instruction, and instruct the security agent process to forward the security detecting instruction to the target container process; and the detection unit is configured to acquire, from the security agent process, data to be detected generated by the target container process in response to the security detecting instruction, and perform security detection on the data to be detected.

According to one or more embodiments of the present application, [Example 15] provides a security detecting apparatus for a container, which further includes the fourth transmission unit.

The fourth transmission unit is configured to transmit a file coping instruction to the security agent process, in which the file coping instruction includes information of a detection file and is used to instruct the security agent process to acquire the detection file according to the information of the detection file, and writing the detection file into a specified path in the namespace of the target container process.

According to one or more embodiments of the present application, [Example 16] provides a security detecting apparatus for a container, in which the third transmission unit is specifically configured to:

transmit, to the security agent process, a loading instruction of the detection file, and instruct the security agent process to forward the loading instruction of the detection file to the target container process, in which the loading instruction of the detection file is used to instruct the target container process to acquire the detection file from the specified path and load and execute the detection file to generate data to be detected.

According to one or more embodiments of the present application, [Example 17] provides a security detecting apparatus for a container, which further includes the fifth transmission unit, and an acquisition unit.

The fifth transmission unit is configured to transmit, to the security agent process, a shared memory creating instruction, instruct the security agent process to create a shared memory in the namespace of the target container process, and transmit an identifier of the shared memory to the detection process.

The acquisition unit is configured to acquire the identifier of the shared memory.

According to one or more embodiments of the present application, [Example 18] provides a security detecting apparatus for a container, which further includes the sixth transmission unit.

The sixth transmission unit is configured to transmit, to the security agent process, a shared memory identifier distributing instruction, and instruct the security agent process to transmit the identifier of the shared memory to the target container process, in which the identifier of the shared memory is used to instruct the target container process to write the data to be detected into the shared memory after generating the data to be detected.

According to one or more embodiments of the present application, [Example 19] provides a security detecting apparatus for a container, in which the detection unit is specifically configured to:

acquire, by the detection process, the data to be detected from the security agent process, and perform security detection on the data to be detected, in which the data to be detected is acquired by the security agent process from the shared memory.

According to one or more embodiments of the present application, [Example 20] provides a security detecting apparatus for container, which further includes a creation unit.

The creation unit is configured to create a control group by the detection process, set a processor limit and/or memory limit of the control group, and switch the security agent process into the control group.

According to one or more embodiments of the present application, [Example 21] provides a security detecting apparatus for container, which includes the first reception unit, the switching unit, the second reception unit, the establishment unit, the third reception unit, and the acquisition unit.

The first reception unit is configured to receive, after a namespace of a detection process starts a security agent process, a namespace switching instruction transmitted by the detection process, in which the namespace switching instruction includes an identifier of a target container process.

The switching unit is configured to switch from the namespace of the detection process to the namespace of the target container process in response to the namespace switching instruction.

The second reception unit is configured to receive an injecting instruction transmitted by the detection process, in which the injecting instruction includes an identifier of the target container process.

The establishment unit is configured to establish a communication connection with the target container process in response to the injecting instruction.

The third reception unit is configured to receive a security detecting instruction transmitted by the detection process, and forward the security detecting instruction to the target container process.

The acquisition unit is configured to acquire data to be detected generated by the target container process in response to the security detecting instruction, and transmit the data to be detected to the detection process.

According to one or more embodiments of the present application, [Example 22] provides a security detecting apparatus for a container, which further includes the fourth reception unit and the writing unit.

The fourth reception unit is configured to receive a file coping instruction transmitted by the detection process, in which the file coping instruction includes information of a detection file.

The writing unit is configured to acquire, according to the information of the detection file, the detection file, and write the detection file into a specified path in the namespace of the target container process.

According to one or more embodiments of the present application, [Example 23] provides a security detecting apparatus for a container, in which the third reception unit is specifically configured to:

receive, by the security agent process, a loading instruction of the detection file transmitted by the detection process, and forward the loading instruction of the detection file to the target container process, in which the loading instruction of the detection file is used to instruct the target container process to acquire the detection file from the specified path and load and execute the detection file to generate data to be detected.

According to one or more embodiments of the present application, [Example 24] provides a security detecting apparatus for a container, which further includes the fifth reception unit.

The fifth reception unit is configured to receive a shared memory creating instruction transmitted by the detection process, create a shared memory in the namespace of the target container process, and transmit an identifier of the shared memory to the detection process.

According to one or more embodiments of the present application, [Example 25] provides a security detecting apparatus for a container, which further includes the sixth reception unit.

The sixth reception unit is configured to receive a shared memory identifier distributing instruction transmitted by the detection process, transmit the identifier of the shared memory to the target container process, and instruct the target container process to write the data to be detected into the shared memory after generating the data to be detected.

According to one or more embodiments of the present application, [Example 26] provides a security detecting apparatus for container, in which the acquisition unit is specifically configured to:

acquire, by the security agent process, the data to be detected generated by the target container process from the shared memory, and transmit the data to be detected to the detection process.

According to one or more embodiments of the present application, [Example 27] provides an electronic device, including:

one or more processors;
a storage having stored one or more programs thereon,
the one or more programs, when executed by the one or more processors, cause the one or more processors to implement the security detecting method for container as described in any of Examples 1 to 7 or the security detecting method for container as described in any of Examples 8 to 13.

According to one or more embodiments of the present application, [Example 28] provides a computer-readable medium having stored a computer program thereon, in which the program, when executed by a processor, implements the security detecting method for container as described in any of [Example 1] to [Example 7] or the security detecting method for container as described in any of [Example 8] to [Example 13].

It should be noted that various embodiments in this specification is described in a progressive way, and the various embodiments focus on differences from each other, so it is necessary to refer to the same and similar parts among the various embodiments. As for a system or device disclosed in the embodiments, since it corresponds to the method disclosed in the embodiments, the corresponding description is relatively simple, and the related points can refer to the illustration of the method part.

It should be understood that in the present application, "at least one (item)" means one or more, and "multiple" means two or more. The term "and/or", which is used to describe a relationship between associated objects, indicates that there can be three kinds of relationships. For example, "A and/or B" may indicate 3 cases: "only A", "only B", and "both A and B", where A and B may be singular or plural. The character "/" generally indicates an "or" relationship between the front and behind associated objects. The term "at least one (item) of the following" or similar expressions thereof refer to any combination of these items, including any combination of single item(s) or plural item(s). For example, at least one (item) of A, B or C may indicate: "A", "B", "C", "A and B", "A and C", "B and C", or "A and B and C", where A, B and C may be single or plural.

It should also be noted that in this document, the relational terms such as "first" and "second" are merely used to distinguish one entity or operation from another, and do not necessarily require or imply that there is any such actual relationship or order between these entities or operations. Moreover, the terms "include", "comprise" or any other variation thereof are intended to encompass non-exclusive inclusion, so that a procedure, method, article or equipment including a series of elements includes not only those elements, but also other elements not explicitly listed or elements inherent to such procedure, method, article or equipment. Without further limitations, an element defined by phrase "including a . . . " does not exclude the existence of other identical elements in the procedure, method, article or equipment including the said element.

The steps of a method or algorithm described in conjunction with the embodiments disclosed herein may be directly implemented in hardware, a software module executed by a processor, or a combination of both. The software module may be placed in random access memory (RAM), internal memory, read-only memory (ROM), electrically programmable ROM, electrically erasable programmable ROM, register, hard disk, removable disk, CD-ROM, or any other forms of storage medium known in the art.

The foregoing description of the disclosed embodiments enables those skilled in the art to implement or use the present application. Many modifications to these embodiments will be obvious to those skilled in the art, and the general principles defined herein can be implemented in other embodiments without departing from the spirit or scope of the present application. Therefore, the present application will not be limited to the embodiments shown herein, but is to conform to the widest scope consistent with the principles and novel features disclosed herein.

What is claimed is:

1. A security detecting method for a container, comprising:
   starting a security agent process in a namespace of a detection process;
   transmitting, to the security agent process through the detection process, a namespace switching instruction, wherein the namespace switching instruction comprises an identifier of a target container process and is used to instruct the security agent process to switch from the namespace of the detection process to a namespace of the target container process;
   transmitting, to the security agent process through the detection process, an injecting instruction, wherein the injecting instruction comprises an identifier of the target container process and is used to instruct the security agent process to establish a communication connection with the target container process;
   transmitting, to the security agent process through the detection process, a security detecting instruction, and instructing the security agent process to forward the security detecting instruction to the target container process; and
   acquiring, from the security agent process through the detection process, data to be detected generated by the target container process in response to the security detecting instruction, and performing a security detection on the data to be detected.

2. The method according to claim 1, wherein after the transmitting, to the security agent process through the detection process, the namespace switching instruction, the method further comprises:
   transmitting, to the security agent process through the detection process, a file coping instruction, wherein the file coping instruction comprises information of a detection file and is used to instruct the security agent process to acquire the detection file according to the information of the detection file, and write the detection file into a specified path in the namespace of the target container process.

3. The method according to claim 2, wherein the transmitting, to the security agent process through the detection process, the security detecting instruction, and instructing the security agent process to forward the security detecting instruction to the target container process comprises:
   transmitting, to the security agent process through the detection process, a loading instruction of the detection file, and instructing the security agent process to forward the loading instruction of the detection file to the target container process, wherein the loading instruction of the detection file is used to instruct the target container process to acquire the detection file from the specified path and load and execute the detection file to generate the data to be detected.

4. The method according to claim 1, wherein after the transmitting, to the security agent process through the detection process, the namespace switching instruction, the method further comprises:
   transmitting, to the security agent process through the detection process, a shared memory creating instruction, instructing the security agent process to create a shared memory in the namespace of the target container process, and transmitting an identifier of the shared memory to the detection process; and
   acquiring the identifier of the shared memory through the detection process.

5. The method according to claim 4, further comprising:
   transmitting, to the security agent process through the detection process, a shared memory identifier distributing instruction, and instructing the security agent process to transmit the identifier of the shared memory to the target container process, wherein the identifier of the shared memory is used to instruct the target container process to write the data to be detected into the shared memory after generating the data to be detected.

6. The method according to claim 5, wherein the acquiring, from the security agent process through the detection process, the data to be detected generated by the target container process in response to the security detecting instruction, and the performing security detection on the data to be detected comprises:
   acquiring, from the security agent process through the detection process, the data to be detected, and performing the security detection on the data to be detected, wherein the data to be detected is acquired by the security agent process from the shared memory.

7. The method according to claim 1, wherein before the transmitting, to the security agent process through the detection process, the namespace switching instruction, the method further comprises:
   creating a control group through the detection process, setting a processor limit and/or a memory limit of the control group, and switching the security agent process into the control group.

8. A non-transitory computer-readable medium having stored a computer program thereon, wherein the computer program, when executed by a processor, causes the processor to implement the security detecting method for a container according to claim 1.

9. A security detecting method for a container, comprising:
receiving, after a security agent process is started in a namespace of a detection process, through the security agent process, a namespace switching instruction transmitted by the detection process, wherein the namespace switching instruction comprises an identifier of a target container process;
switching, through the security agent process, from the namespace of the detection process to a namespace of the target container process in response to the namespace switching instruction;
receiving, through the security agent process, an injecting instruction transmitted by the detection process, wherein the injecting instruction comprises an identifier of the target container process;
establishing, through the security agent process, a communication connection with the target container process in response to the injecting instruction;
receiving, through the security agent process, a security detecting instruction transmitted by the detection process, and forwarding the security detecting instruction to the target container process; and
acquiring, through the security agent process, data to be detected generated by the target container process in response to the security detecting instruction, and transmitting the data to be detected to the detection process.

10. The method according to claim 9, wherein after the switching, through the security agent process, from the namespace of the detection process to the namespace of the target container process in response to the namespace switching instruction, the method further comprises:
receiving, through the security agent process, a file coping instruction transmitted by the detection process, wherein the file coping instruction comprises information of a detection file; and
acquiring, according to the information of the detection file through the security agent process, the detection file, and writing the detection file into a specified path in the namespace of the target container process.

11. The method according to claim 10, wherein the receiving, through the security agent process, the security detecting instruction transmitted by the detection process, and forwarding the security detecting instruction to the target container process comprises:
receiving, through the security agent process, a loading instruction of the detection file transmitted by the detection process, and forwarding the loading instruction of the detection file to the target container process, wherein the loading instruction of the detection file is used to instruct the target container process to acquire the detection file from the specified path and load and execute the detection file to generate the data to be detected.

12. The method according to claim 9, wherein after the switching, through the security agent process, from the namespace of the detection process to the namespace of the target container process in response to the namespace switching instruction, the method further comprises:
receiving, through the security agent process, a shared memory creating instruction transmitted by the detection process, creating a shared memory in the namespace of the target container process, and transmitting an identifier of the shared memory to the detection process.

13. The method according to claim 12, further comprising:
receiving, through the security agent process, a shared memory identifier distributing instruction transmitted by the detection process, transmitting the identifier of the shared memory to the target container process, and instructing the target container process to write the data to be detected into the shared memory after generating the data to be detected.

14. The method according to claim 13, wherein the acquiring, through the security agent process, the data to be detected generated by the target container process in response to the security detecting instruction, and transmitting the data to be detected to the detection process comprises:
acquiring, through the security agent process, the data to be detected generated by the target container process from the shared memory, and transmitting the data to be detected to the detection process.

15. An electronic device, comprising:
one or more processors;
a storage apparatus having stored one or more programs thereon,
wherein the one or more programs, when executed by the one or more processors, cause the one or more processors to implement the security detecting method for a container according to claim 9.

16. A non-transitory computer-readable medium having stored a computer program thereon, wherein the computer program, when executed by a processor, causes the processor to implement the security detecting method for a container according to claim 9.

17. An electronic device, comprising:
one or more processors;
a storage apparatus having stored one or more programs thereon,
wherein the one or more programs, when executed by the one or more processors, cause the one or more processors to:
start a security agent process in a namespace of a detection process;
transmit, to the security agent process through the detection process, a namespace switching instruction, wherein the namespace switching instruction comprises an identifier of a target container process and is used to instruct the security agent process to switch from the namespace of the detection process to a namespace of the target container process;
transmit, to the security agent process through the detection process, an injecting instruction, wherein the injecting instruction comprises an identifier of the target container process and is used to instruct the security agent process to establish a communication connection with the target container process;
transmit, to the security agent process through the detection process, a security detecting instruction, and instruct the security agent process to forward the security detecting instruction to the target container process; and
acquire, from the security agent process through the detection process, data to be detected generated by the target container process in response to the security detecting instruction, and perform a security detection on the data to be detected.

18. The electronic device according to claim 17, wherein after the transmitting, to the security agent process through the detection process, the namespace switching instruction, the one or more processors are further caused to:
- transmit, to the security agent process through the detection process, a file coping instruction, wherein the file coping instruction comprises information of a detection file and is used to instruct the security agent process to acquire the detection file according to the information of the detection file, and write the detection file into a specified path in the namespace of the target container process.

19. The electronic device according to claim 18, wherein the one or more processors are further caused to:
- transmit, to the security agent process through the detection process, a loading instruction of the detection file, and instruct the security agent process to forward the loading instruction of the detection file to the target container process, wherein the loading instruction of the detection file is used to instruct the target container process to acquire the detection file from the specified path and load and execute the detection file to generate the data to be detected.

20. The electronic device according to claim 17, wherein after the transmitting, to the security agent process through the detection process, the namespace switching instruction, the one or more processors are further caused to:
- transmit, to the security agent process through the detection process, a shared memory creating instruction, instruct the security agent process to create a shared memory in the namespace of the target container process, and transmit an identifier of the shared memory to the detection process; and
- acquire the identifier of the shared memory through the detection process.

* * * * *